United States Patent
Feichtner et al.

(10) Patent No.: US 10,065,501 B2
(45) Date of Patent: Sep. 4, 2018

(54) CONTROL SYSTEM FOR AN ALL-WHEEL CLUTCH

(71) Applicant: Magna Powertrain AG & Co KG, Lannach (AT)

(72) Inventors: Hans-Thomas Feichtner, Graz (AT); Johannes Quehenberger, Raaba (AT); Werner Schöfmann, Graz (AT)

(73) Assignee: MAGNA POWERTRAIN AG & CO KG, Lannach (AT)

( * ) Notice: Subject to any disclaimer, the term of this patent is extended or adjusted under 35 U.S.C. 154(b) by 687 days.

(21) Appl. No.: 14/424,579

(22) PCT Filed: Aug. 30, 2013

(86) PCT No.: PCT/EP2013/067980
§ 371 (c)(1),
(2) Date: Feb. 27, 2015

(87) PCT Pub. No.: WO2014/037285
PCT Pub. Date: Mar. 13, 2014

(65) Prior Publication Data
US 2015/0224875 A1    Aug. 13, 2015

(30) Foreign Application Priority Data

Sep. 5, 2012 (DE) .......... 10 2012 215 696

(51) Int. Cl.
*B60K 23/08* (2006.01)
*B60K 17/344* (2006.01)
(Continued)

(52) U.S. Cl.
CPC ........ *B60K 23/0808* (2013.01); *B60K 17/344* (2013.01); *B60K 17/35* (2013.01); *B60K 5/02* (2013.01); *B60K 2023/085* (2013.01)

(58) Field of Classification Search
CPC .. B60K 23/0808; B60K 17/344; B60K 17/35; B60K 2023/085; B60K 5/02
See application file for complete search history.

(56) References Cited

U.S. PATENT DOCUMENTS 5,060,747 A    10/1991   Eto
6,029,511 A *  2/2000   Welsch ............... B60K 28/165
                                                180/338
(Continued)

FOREIGN PATENT DOCUMENTS

DE    3621225    5/1987
DE    3625025    11/1988
(Continued)

OTHER PUBLICATIONS

International Search Report dated Dec. 9, 2013 (PCT/EP2013/067980).
German Search Report dated Feb. 26, 2015.

*Primary Examiner* — David J Hlavka
(74) *Attorney, Agent, or Firm* — Dickinson Wright PLLC

(57) ABSTRACT

A method and a corresponding controller for the four-wheel drive of a motor vehicle are described, consisting of a clutch (AK) disposed in the drive train between a primary axle and a secondary axle (VA, HA) of the four-wheel drive, by means of which the drive torque of a primary axle (KHA, HA) driven by an engine (VKM, SG) can be distributed to a secondary axle (KVA, VA), wherein the controller (S) has a signal connection to the clutch (AK) and to sensors recording the revolution rates of at least one wheel of the primary axle (HA) and one wheel of the secondary axle (VA) and the clutch (AK) is controlled by means of the controller (S) below a specified torque such that a significantly reduced transfer of torque to the secondary axle (VA) is carried out.

14 Claims, 3 Drawing Sheets

Figure 1:
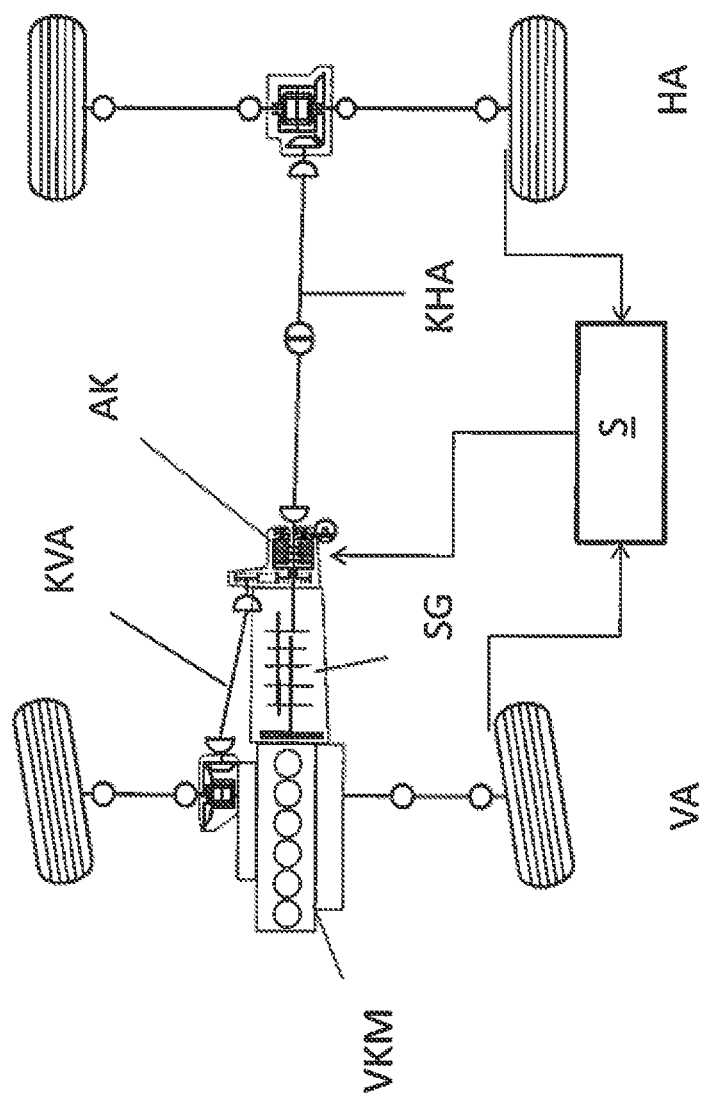

(51) Int. Cl.
*B60K 17/35* (2006.01)
*B60K 5/02* (2006.01)

(56) References Cited

U.S. PATENT DOCUMENTS

| | | | | |
|---|---|---|---|---|
| 6,055,488 A * | 4/2000 | Nakajima | ............. | B60C 23/061 |
| | | | | 702/96 |
| 7,630,812 B2 * | 12/2009 | Jiang | ..................... | F16D 48/066 |
| | | | | 477/174 |
| 8,474,567 B2 * | 7/2013 | Parigger | ................. | F16D 48/06 |
| | | | | 180/233 |

FOREIGN PATENT DOCUMENTS

| | | |
|---|---|---|
| DE | 3721626 | 9/1991 |
| DE | 19706720 | 10/1997 |
| DE | 10260196 | 7/2004 |
| EP | 1188597 | 6/2007 |
| WO | 2012110659 | 8/2012 |

\* cited by examiner

CONTROL SYSTEM FOR AN ALL-WHEEL CLUTCH

CROSS-REFERENCE TO RELATED APPLICATIONS

This application is a National Stage of International Application No. PCT/EP2013/067980 filed Aug. 30, 2013 which claims the benefit and priority of German Application No. 10 2012 215 696.8 filed Sep. 5, 2012. The entire disclosure of the above applications is incorporated herein by reference.

FIELD

The invention relates to a method for controlling a clutch in the four-wheel drive of a motor vehicle and for correspondingly controlling a four-wheel drive in the manner of the method claim and of the device claim.

BACKGROUND

With vehicles driven by means of the front axle or the rear axle, the front axle rotates (average speed of the two front wheels) slightly differently to the rear axle (average speed of the two rear wheels). The revolution rate difference here is the result of different dynamic tire radii, manufacturing tolerances, different tire wear, different axle loads, differences in the tire pressure, mixed tires and wheel slip caused by the drive torque. During cornering the revolution rate difference is the result of the different rolling distances travelled by the wheels.

With all-wheel drive vehicles—for example a vehicle with front wheel drive and a rear wheel drive that can be selected by means of a clutch—a further revolution rate difference can be added because of a difference in transmission ratios in the axle gears.

When the driving situation of straight line travel at constant speed is considered, a revolution rate difference of <1% is usually detected. In said driving situation the all-wheel drive is not required, but which of the two axles is the faster and which is the slower depends in particular on the dynamic radii of the tires and is random. With the all-wheel drive clutch engaged or the centre differential locked, losses therefore result, the speed difference decreasing by means of the tire slip.

When the drive torques to be transferred by the drive shafts and propeller shaft during an acceleration process are considered, it often appears that the torque of the front axle undergoes a change of sign when transitioning to a constant speed, i.e. when the acceleration process finishes. The front axle changes from traction mode to drag mode. The front axle brakes, the rear axle pushes a little more and the drive system runs under stress. A reactive torque flow results, which overall causes higher torques in the front axle and in the rear axle. With a gearbox the efficiency in the traction mode is generally greater than in the drag mode, so that the indicated losses are even greater.

A method for controlling a controllable clutch in the drive train between the front axle and the rear axle of a four-wheel drive is described in DE 197 006 720 A1. A wheel revolution rate sensor is associated with each of the wheels—the signals of said sensors are analyzed. A theoretical revolution rate difference of the clutch is determined for the drive mode without wheel slip, the difference being determined from the speed of travel, the radius of the turn and the different wheel radii. A revolution rate difference for which turning occurs without wheel slip is determined, and the clutch is adjusted by means of a generated control signal according to said revolution rate difference value.

DE 36 26 025 A1 presents is similarly operating drive device for an all-wheel drive vehicle with a friction plate clutch for variable transfer of a drive torque to the front wheels.

With the four-wheel drive according to DE 37 21 626 C2, to improve the braking behavior the clutch in the drive train between the front axle and the rear axle is disengaged on exceeding a specified revolution rate reduction gradient.

DE 36 21 225 C1 discloses an all-wheel drive with a permanently acting rear wheel drive and a front axle drive that can be selected by means of an electrohydraulically controlled clutch. On exceeding a slip threshold, the clutch is briefly disengaged, which prevents stresses in the drive train.

Controlling a clutch in the drive train between the front and rear axles of a vehicle with four-wheel drive according to DE 102 60 196 A1 has the effect that the clutch is always subjected to torque, i.e. is never fully disengaged. A better transition in the event of requiring all-wheel drive should thus be achieved.

With DE 69 025 487 T2, for drive force distribution a correction factor is determined for determining the true speed on the basis of the revolution rate difference and the measured speed.

SUMMARY

The object of the present invention is to propose a controller for an all-wheel drive clutch in an improved implementation compared to the known solutions.

This object is achieved by the features of the method claim and the associated device claim. Developments are revealed in the respective dependent claims.

The solution according to the invention thus consists of driving situation-dependent control of the all-wheel drive clutch for optimizing the drive train losses. The clutch to be used according to the invention is designed such that a very low torque can be set, which is possible for example by using a fully open position. The clutch can thus be operated in a wide open position in which no or a low residual torque is transferred between the front and rear axles. Such a low transfer torque can for example also or additionally be set by means of a reduction of the quantity of lubricating oil and cooling oil in a plate pack.

Depending on the driving situation, the (loss-)optimal clutch position for the current driving situation is calculated and set on the basis of the wheel speeds. Additional drive train losses arising as a result of revolution rate differences between the front and rear axles can be avoided in this way. The invention thus uses a calculation method for the current differences of the tire radii between the front and rear axles and a corresponding strategy for controlling the all-wheel drive clutch distributing the drive power to the front and rear wheels.

Based on wheel revolution rate sensor signals, the difference of the dynamic tire radii between the front and rear axles of the respective vehicle can be calculated with the precise current tires, the load and the air pressure. Depending on the difference of the dynamic tire radii between the front and rear axles, the state of the all-wheel drive clutch is adjusted depending on the driving situation in order to minimize the drive train losses.

When driving at constant speed in the lower speed range, it is advantageous according to the invention to fully disengage the all-wheel drive clutch, i.e. to make it wide open, in order to not generate any additional drive train losses.

Above a certain speed (from a certain drive torque), the primary axle (for example the rear axle) reaches a slip that is at a level such that the front axle turns more slowly than the rear axle, and by setting a clutch torque at the all-wheel clutch the front axle is no longer put into drag mode but the losses from reactive torques can now only be minimized. From said limit speed, which is dependent on the torque to be transferred, it thus no longer makes sense to fully disengage the all-wheel clutch. From said limit speed the all-wheel drive clutch is now operated by feedforward, which means that the front axle is always also driven by means of the distribution gearbox, the all-wheel drive clutch, and is no longer exclusively driven by the road.

Furthermore, the explanation of an exemplary embodiment of the invention is carried out using the figures.

DRAWINGS

Figure 2:
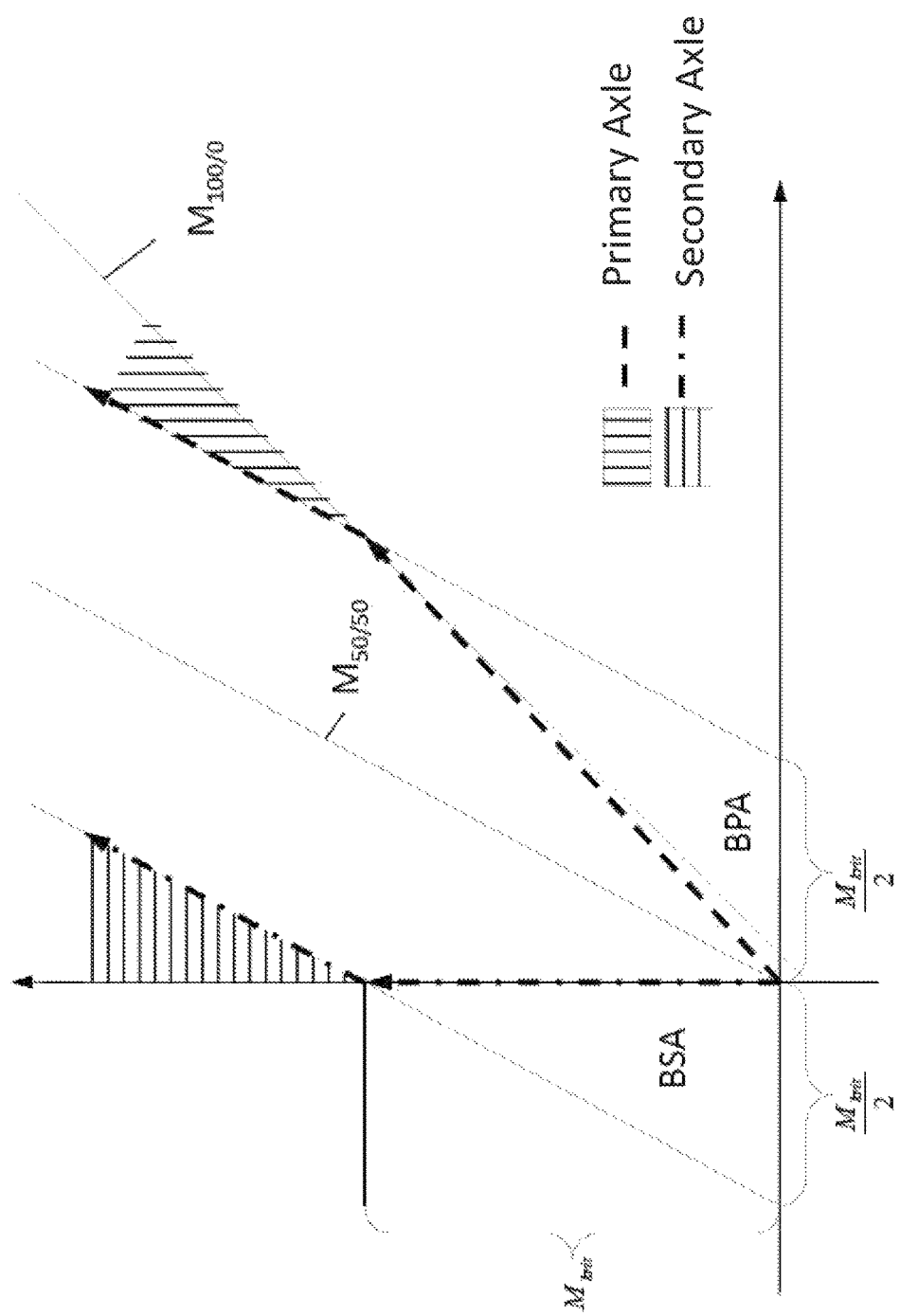
Figure 3:
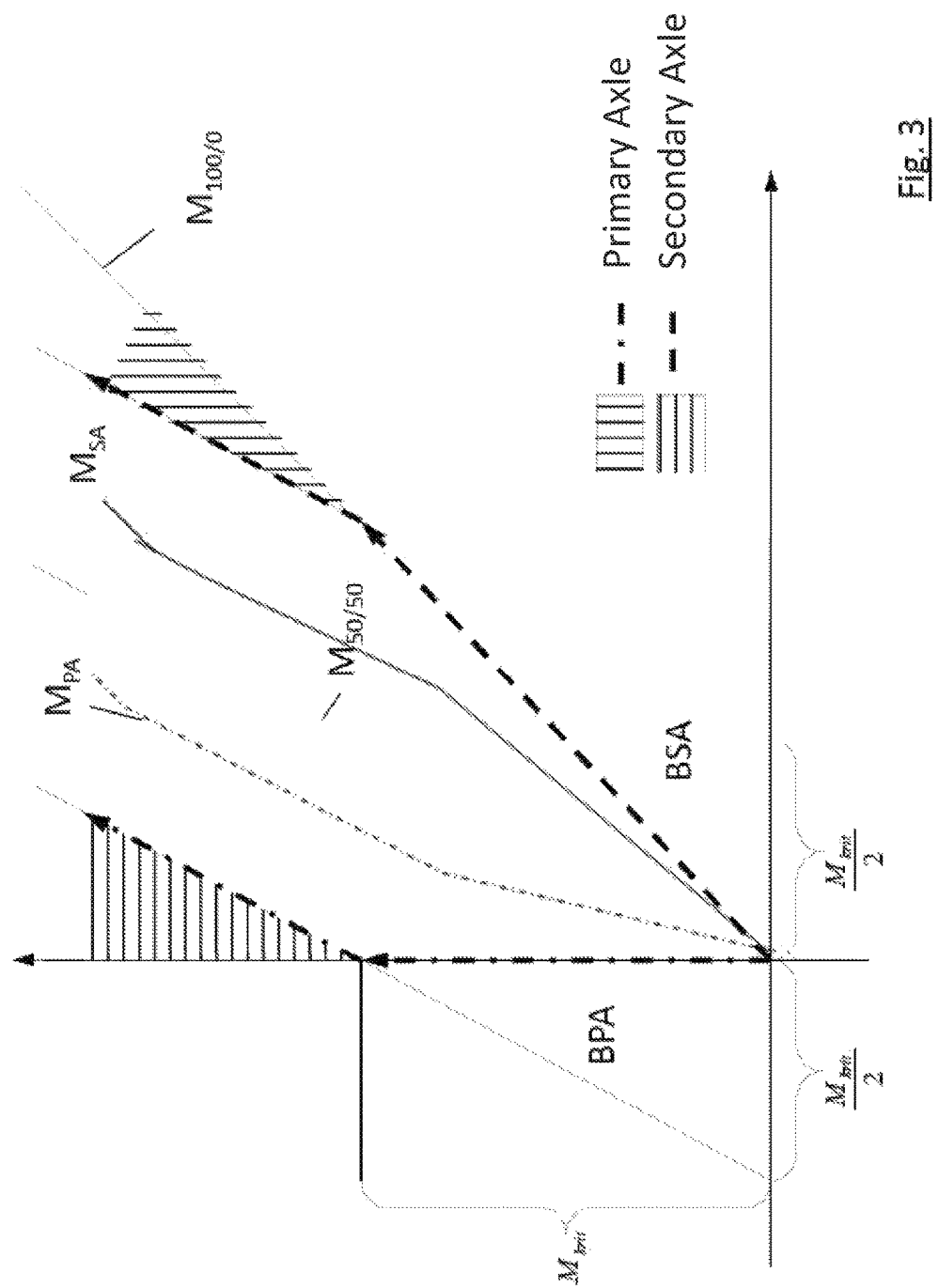

FIG. 1 illustrates an all-wheel drive vehicle and a controller in accordance with the present disclosure;

FIG. 2 diagramatically illustrates a possible torque distribution between the primary axle and the secondary axle of the all-wheel drive vehicle; and FIG. 3 diagramatically illustrates another possible torque distribution between the primary axle and the secondary axle of the all-wheel drive vehicle.

DETAILED DESCRIPTION

FIG. 1 shows the basic components of an all-wheel drive vehicle, consisting of an internal combustion engine VKM, a downstream automatically or manually shifted gearbox SG, which drives the wheels of the rear axle HA, in this case the primary axle PA, by means of a propeller shaft KHA. In the exemplary embodiment described here, the rear axle is to be understood to be the primary drive axle, which should not limit the general idea of the invention however.

The output of the gearbox SG acts on the rear wheels HA of a rear axle—i.e. on the wheels of the primary axle—by means of a propeller shaft KHA. The output of the gearbox acts in parallel by means of an all-wheel drive clutch AK, which for its part transfers a variable drive torque by means of a propeller shaft KVA to the wheels of the front axle—i.e., the secondary axle in the exemplary embodiment shown. Losses occur with the all-wheel drive clutch AK engaged—for example through radius differences of the wheels. The axles run at the same revolution rate, i.e. there is a higher loss of power compared to the power loss with a revolution rate difference that is set according to the tire radii. Because of the occurrence of stresses in the drive train, increased torques occur in the axle gears and therefore increased losses.

Furthermore, FIG. 1 shows a controller S with a signal connection to wheel revolution rate sensors associated with the wheels of the front and rear axles VA, HA, which is indicated by the arrows. The clutch AK is controlled by the controller S such that a defined proportion of the torque of the propeller shaft KHA (in the exemplary embodiment the torque fed to the primary axle) is taken off by means of the propeller shaft KVA to drive the front wheels (in this case the secondary axle).

With a vehicle the variables stated below, i.e. measurement variables, are available or are recorded: engine torque, wheel revolution rates (front and rear axles), steering angle and the current overall transmission ratio. Furthermore, the speed of the vehicle also results from the revolution rates of the wheels in combination with the tire radii.

The ratio between primary and secondary axle tire radii $r_{PA}/r_{SA}$, i.e. the ratio of the tire radii of the rear and the front axles HA, VA, can be calculated from the wheel revolution rates. Furthermore, it is assumed that the slip in the relevant region is a linear function (approximately or completely linear) of the torque.

In order to calculate the speed from which the wheel revolution rates (front axle VA, rear axle HA) are compensated, the following driving situation is considered: constant speed—all-wheel drive clutch disengaged—the drive is purely by means of the primary or main drive axle.

The following applies or results:

$\Delta n = n_{PA} - n_{SA}$ difference between primary and secondary axis revolution rate $$n_{PA} = (v_{Fzg}/r_{PA}) + (v_{Schlupf\_PA}/r_{PA})$$

Where:

$v_{Schlupf\_PA} = v_{Fzg} \cdot M/k$ slip speed at given speed of the vehicle and axle torque M and k is a linear assumed tire stiffness characteristic value $$\Delta n = V_{Fzg}/r_{PA} \cdot (1 + M_{krit}/k) - v_{Fzg}/r_{SA}$$

Setting non-slip level to $\Delta n = 0$ gives:

$$r_{PA}/r_{SA} = (1 + M_{krit}/k)$$

From the recordable ratio between the primary and secondary axle tire radii $r_{PA}/r_{SA}$, the critical drive torque and hence the speed of the vehicle can be determined at which $\Delta n = 0$. i.e.:

$$M_{krit} = k \cdot (r_{PA}/r_{SA} - 1)$$

This calculation can be expanded further by taking into account a possible transmission ration difference of the axles:

z number of teeth $$i_{SA} = Z_{SA\ output}/Z_{SA\ input}$$

$$i_{PA} = z_{PA\ output}/z_{PA\ input}$$

$$M_{krit} = k \cdot ((r_{PA} \cdot i_{SA})/(r_{SA} \cdot i_{PA}) - 1)$$

FIG. 2 shows possible torque distributions between the primary axle PA and the secondary axle SA in a diagram. The abscissa is graduated in the torque of the axle input drive—the primary and the secondary axle. The ordinate represents the sum of the torques of the axle inputs. The line $M_{50/50}$ corresponds to an equal torque distribution, i.e. the all-wheel clutch AK or a suitable differential (open) apportions 50% of the drive power to the primary axle, 50% to the secondary axle.

The line $M_{100/0}$ corresponds to a torque distribution between the primary and secondary axles of 100% to 0%, i.e. all the drive power goes to the primary axle (in this case the rear axle), giving pure two-wheel drive. The region BSA corresponds to the reactive torque region of the secondary axle, the region BPA to the reactive torque region of the primary axle. In the diagram according to FIG. 2, the torque distribution by means of the all-wheel drive clutch AK is within the area that is enclosed by lines characterized as the primary and secondary lines (dashed, dash-dotted).

With a drive torque of less than $M_{krit}$, it is not possible to set an all-wheel torque without generating a reactive torque. It is only possible to usefully apply a drive torque to the road with distribution to the primary and secondary axles from a drive torque greater than $M_{krit}$.

As long as $M_{krit}$ (sum of torques) is not reached, the torque on the all-wheel drive clutch AK is reduced as far as possible. Therefore an all-wheel system with an all-wheel drive clutch AK is used with which the residual torque on the clutch can be substantially reduced, i.e. with which as great a separation of torque as possible can be achieved.

If $M_{krit}$ is approximately reached (depending on tolerances to be taken into account, the point cannot be exactly determined), the reduction of the torque demand is removed, the purely two-wheel drive being abandoned. Above the limit speed associated with $M_{krit}$, the drive torque is distributed to the primary and the secondary axles according to the requirements of driving dynamics and traction.

FIG. 3 shows possible torque setting ranges for a ratio of the dynamic tire radii $(r_{PA}*i_{SA})/(r_{SA}*i_{PA})<1$. If $i_{SA}$ and $i_{PA}$ are equal, then this is the state in which the dynamic radius $r_{SA}$ of the secondary axle SA (in this case the front axle) is greater than the dynamic radius $r_{PA}$ of the primary axle PA. Because of the geometric ratios here, the secondary axle SA rotates more slowly (because the radius $r_{SA}$ is larger) than the primary axle PA. With the all-wheel drive clutch AK, it is therefore possible to perform a useful torque distribution, even for a speed in the region below the critical drive torque $M_{krit}$, i.e. to travel with true all-wheel drive. This state is illustrated in FIG. 3 and is also the aim.

The profile of the torque distribution on the primary axle is shown with $M_{PA}$ and the profile of the torque distribution on the secondary axle is shown with $M_{SA}$. It can be seen in such a situation—there is a detectable tire radius difference—that torque distribution is already performed before reaching the critical drive torque $M_{krit}$ or the corresponding speed, i.e. driving in the strict two-wheel mode, or according to the all-wheel drive clutch the maximum achievable two-wheel mode, is not carried out until $M_{krit}$.

In the described case, even for torques below $M_{krit}$ a low clutch torque is always set, i.e. part of the drive power can be distributed to the secondary axle. Complete separation of the all-wheel drive clutch is not carried out. In addition it is provided that with a small residual torque (distribution) the losses of the drive train elements to the secondary axle are compensated.

Compensation of the loss torques arising in the angle drive of the secondary axle is advantageously carried out by means of the direct path (distribution gearbox, propeller shaft to the secondary axle), instead of by the indirect path via the primary axle (distribution gearbox, propeller shaft to the primary axle, wheels of primary axle, road, wheels of secondary axle, half shafts to secondary axle). The residual torque in the clutch should then correspond to that torque that is used to rotate the components of the secondary drive train. In general, efficiency advantages result from this.

When using the invention it is therefore also useful, when selecting or fitting the wheels and tires, to ensure that the larger wheels are fitted to the secondary axle, i.e. the front axle in this case. Thus the tires can be delivered to a vehicle assembly plant classified by means of an IST size and classes with the larger rolling circumferences can be fitted to the secondary axle.

REFERENCE CHARACTER LIST

VKM engine, internal combustion engine
SG gearbox, manually or automatically shifted gearbox
VA front axle
SA secondary axle
HA rear axle
PA primary axle
AK all-wheel drive clutch
S controller
KVA propeller shaft front axle
KHA propeller shaft rear axle

The invention claimed is:

1. A method for controlling a clutch in a drive train between a primary axle and a secondary axle of a four-wheel drive vehicle, the method including:
   distributing drive torque from an engine directly to the primary axle;
   distributing drive torque from the engine to the secondary axle with the clutch or a distribution gearbox;
   determining a speed of the vehicle and revolution rates of wheels of the primary and secondary axles of the vehicle, and determining a specified drive torque based on the speed of the vehicle and the revolution rates of the wheels of the vehicle;
   setting a second axle torque to a provided value, wherein the second axle torque is transmitted through the variable clutch or the distribution gearbox to the secondary axle, and wherein the provided value is approximately zero when the specified drive torque is below a predetermined value.

2. The method as claimed in claim 1, wherein the provided value is set such that no torque transfer to the wheels of the secondary axle takes place.

3. The method as claimed in claim 1, wherein the specified drive torque is determined from an effective dynamic tire radii of the wheels of the primary and the secondary axles.

4. The method as claimed in claim 3, wherein wheel revolution rate signals from revolution rate sensors associated with the wheels of the primary and the secondary axles are analyzed for determining the specified drive torque.

5. The method as claimed in claim 3, wherein the second axle torque transmitted through the clutch or gearbox is selected such that revolution rates of the primary and the secondary axles are identical for given effective tire radii of the wheels of the primary and secondary axles and a determined tire stiffness characteristic value.

6. The method as claimed in claim 5, wherein transmission ratios between the primary and the secondary axles are taken into account during the determination of the specified drive torque.

7. The method as claimed in claim 1, wherein tires with a higher effective dynamic radius are fitted on the secondary axle than the primary axle.

8. A controlling system for a four-wheel drive system of a motor vehicle, the controlling system including a clutch disposed in a drive train of the vehicle between a primary axle and a secondary axle of the four-wheel drive system, by means of which a drive torque of the primary axle driven by an engine can be distributed to the secondary axle, wherein a controller has a signal connection to the clutch as well as to sensors recording revolution rates of at least one wheel of the primary axle and at least one wheel of the secondary axle and the clutch is controlled by means of the controller to determine a specified drive torque based on the sensors, and to set a second axle torque to a provided value, wherein the second axle torque is transmitted through the clutch to the second axle, and wherein the provided value is approximately zero when the specified drive torque is below a predetermined value.

9. The controlling system as claimed in claim 8, wherein the clutch is switched by the controller below the specified drive torque for maximum disconnection of the flow of second axle torque from the primary axle to the secondary axle.

10. The controlling system as claimed in claim 8, wherein the specified drive torque is determined from an effective dynamic tire radii of the at least one wheel of the primary axle and the at least one wheel of the secondary axle.

11. The controlling system as claimed in claim 10, wherein wheel revolution rate signals from the sensors associated with the at least one wheel of the primary axle and the at least one wheel of the secondary axle are analyzed for determining the specified drive torque.

12. The controlling system as claimed in claim 10, wherein the second axle torque is calculated as the specified drive torque for which revolution rates of the primary and the secondary axles are identical for given effective tire radii of the at least one wheel of the primary axle and the at least one wheel of the secondary axle and a specific tire stiffness characteristic value.

13. The controlling system as claimed in claim 12, wherein transmission ratios between the primary and the secondary axles are taken into account during the determination of the specified drive torque.

14. A four wheel drive system of a vehicle including:
an engine;
a primary axle including a pair of primary wheels;
the primary axle directly connected to the engine for distributing a primary drive torque from the engine directly to the primary axle;
a secondary axle including a pair of secondary wheels;
a variable clutch interconnecting the secondary axle to the engine for selectively distributing a provided value of secondary drive torque to the secondary axle;
at least one primary sensor configured to record a revolution rate of at least one of the primary wheels;
at least one secondary sensor configured to record a revolution rate of at least one of the secondary wheels; and
a controller electrically connected to the variable clutch and the primary and secondary sensors and configured to determine a specified drive torque based on the primary and secondary sensors and to establish a provided value of the secondary drive torque to be transmitted to the secondary axle, wherein the provided value is approximately zero when the specified drive torque is below a predetermined value.

* * * * *